(12) United States Patent
Hong

(10) Patent No.: US 8,443,682 B2
(45) Date of Patent: May 21, 2013

(54) ASYMMETRIC-CUP ANEMOMETER

(75) Inventor: Seung-Ho Hong, Medford, OR (US)

(73) Assignee: Met One Instruments, Inc., Grants Pass, OR (US)

( * ) Notice: Subject to any disclaimer, the term of this patent is extended or adjusted under 35 U.S.C. 154(b) by 181 days.

(21) Appl. No.: 13/092,279

(22) Filed: Apr. 22, 2011

(65) Prior Publication Data

US 2012/0266692 A1 Oct. 25, 2012

(51) Int. Cl.
*G01P 5/06* (2006.01)

(52) U.S. Cl.
USPC .......................................... 73/861.85

(58) Field of Classification Search
USPC ................ 73/861.85, 170.01, 170.11, 170.03
See application file for complete search history.

(56) References Cited

U.S. PATENT DOCUMENTS

| 3,465,584 A | | 9/1969 | Turner et al. | |
| 3,541,855 A | * | 11/1970 | Frenzen et al. | 73/861.85 |
| 3,699,801 A | * | 10/1972 | Jones | 73/170.03 |
| 3,713,336 A | * | 1/1973 | Bernstein et al. | 73/170.11 |
| 5,918,276 A | * | 6/1999 | Grindle et al. | 73/170.11 |
| 6,895,812 B2 | * | 5/2005 | Dahlberg | 73/170.01 |

FOREIGN PATENT DOCUMENTS

| EP | 1398637 B1 | 12/2003 |
| EP | 1489427 B1 | 12/2004 |
| FR | 2626675 A1 | 1/1988 |
| GB | 2281617 A1 | 8/1995 |

* cited by examiner

*Primary Examiner* — Jewel V Thompson
(74) *Attorney, Agent, or Firm* — Schneck & Schneck; Thomas Schneck

(57) ABSTRACT

A rotational cup anemometer with an improved design for the cups is herein disclosed. The anemometer has a rotational assembly with essentially identical cups. Each cup is asymmetric to the plane of rotation. Each cup has a central axis parallel to the plane of rotation. Each cup is asymmetric to the central axis of the cup. Each cup may have a lower surface extension that provides a lifting surface, contributes to an upward force as the rotational assembly is rotated or affects presented frontal area at wind angles. A rotation rate of the rotational assembly as a function of wind angle is closer to the ideal cosine curve as compared to a standard anemometer, for a range of wind angles. Rotating the rotational assembly in a wind parallel to the plane of rotation produces a net upward force on the cups that offsets the weight of the rotational assembly.

11 Claims, 7 Drawing Sheets

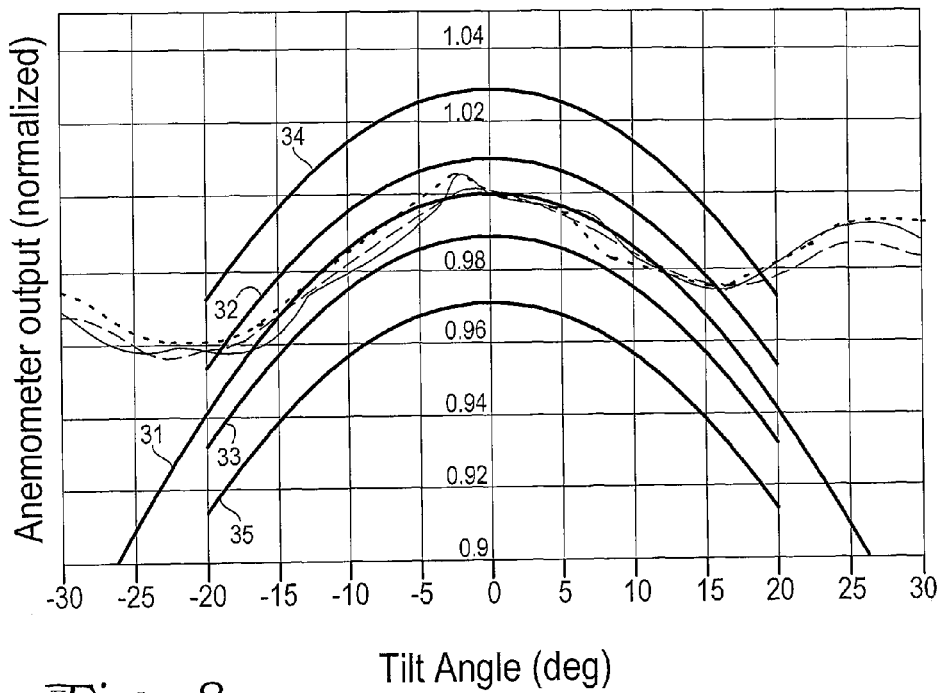
Fig. 8
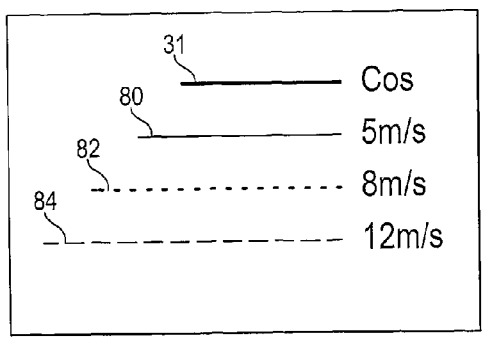

ASYMMETRIC-CUP ANEMOMETER

TECHNICAL FIELD

The technical field of this invention relates to cup anemometers for measuring wind speed and more specifically relates to cups for anemometers.

BACKGROUND

Wind speed can be measured using a conventional three-cup rotational anemometer. Each cup of the anemometer is supported on a respective arm. The arms with attached cups are perpendicularly mounted to a rotational hub or shaft forming a rotational assembly that spins about the rotational axis of the anemometer. The rotational assembly is supported by a bearing attached to a support member such as a shaft. Each cup of the conventional anemometer is cone-shaped or hemispherical and rotationally symmetric about a central axis of the cone or hemisphere. Each cup has an opening or mouth which directs incident wind into the concave body of the cup when the cup is facing in a windward direction i.e. facing towards the direction from which the wind is blowing, and the cup is a "propelled" cup. When the cup is facing in a leeward direction, i.e. facing away from the direction from which the wind is blowing or facing towards the direction towards which the wind is blowing, the rounded or pointed back side of the cup deflects wind, and the cup is a "returning" cup. The difference between the forces on a windward facing "propelled" cup and a leeward facing "returning" cup propels the cups around the rotational axis of the anemometer.

The rotational axis of the anemometer is generally mounted or held as vertical or otherwise perpendicular to the wind flow, for a generally horizontal wind flow, with other mounting angles possibly applicable for other wind angles. Wind speed is related to the rotational speed of the cups about the rotational axis. As a result of symmetry of the cups and arms with respect to the rotational axis, accuracy of the anemometer is generally unaffected by wind direction, e.g. relative to a compass direction, as long as the wind flow is normal to the rotational axis of the anemometer and, equivalently, parallel to the plane of rotation of the rotational assembly. Errors are introduced with high-speed winds or with wind flow deviating from a normal to the rotational axis of the anemometer or equivalently wind flow arriving at an angle deviating from the plane of rotation of the cups. Known variations of the conventional three-cup rotational anemometer include differing numbers of cups and multiple groupings of the cups.

U.S. Pat. No. 3,541,855 to Frenzen et al. discloses an anemometer having two groups of arms and cups, which reduces an overspeeding error as compared to a conventional three-cup anemometer. Each group has three arms and three cups, and the two groups are mounted in spaced apart parallel arrangement perpendicular to the rotational shaft of the anemometer. An overspeeding error of the conventional three-cup anemometer, from wind deviating by an angle from the horizontal, results from wind flow passing over the top or under the bottom of an interfering cup to partially relieve the blocking effect thereof.

U.S. Pat. No. 6,895,812 to Dahlberg discloses an anemometer having at least two cups, with each cup having a substantially triangular shape and arcuate cuts. The corners of the triangles are rounded. An improvement in the flatness of the angular response of the anemometer is observed in winds having an angle of incidence deviating from a normal to the rotational axis of the anemometer. A horizontal sheet at the bottom of the cup, positioned in or parallel with the plane of rotation, reduces the driving moment of the cup and the overspeed of the anemometer for large negative or positive angles of incidence of wind.

EP 1398637 to Schmoling et al. discloses a rotational anemometer having an inclination of cone axes relative to the plane of rotation amounting to several tenths of a degree to several degrees. Inclination of the cone-shaped shells achieves an oblique incident flow characteristic that offsets the flow characteristic of a standard anemometer to correspond to an incident wind flow that is oblique from above the plane of rotation.

For an ideal anemometer, the true speed of the wind arriving at an angle of incidence relative to the plane of rotation of the cups of the anemometer would be measured by the anemometer as proportional to the cosine of the angle of wind incidence. It is a goal of the present invention to improve upon the accuracy of the conventional anemometer at various angles of wind incidence.

SUMMARY

A rotational cup anemometer with an improved design for the cups is herein disclosed. The anemometer has a rotational assembly with a plurality of essentially identical cups arranged in a plane of rotation.

In a first embodiment, each of the cups is asymmetric with regard to a respective central axis. Each cup is asymmetric with regard to the plane of rotation. A rotation rate of the rotational assembly as a function of wind angle is closer to an ideal cosine curve as compared to a standard anemometer, which has axially symmetric cups disposed symmetrically about a respective plane of rotation.

In a second embodiment, each of the cups is asymmetric with regard to the plane of rotation. Each cup has a respective central axis that is parallel to the plane of rotation. Rotating the rotational assembly in a wind that is parallel to the plane of rotation produces a net force on the cups that offsets the weight of the rotational assembly.

In a third embodiment, each of the cups has a respective central axis parallel to the plane of rotation. Each of the cups is asymmetric with regard to both the respective central axis and the plane of rotation. Rotating the rotational assembly in an upright orientation in a wind that is parallel to the plane of rotation produces an upward force and a downward force. The upward force is greater than the downward force.

BRIEF DESCRIPTION OF THE DRAWINGS

FIG. 8 is a graph of anemometer output (normalized) versus wind angle deviation for the rotational anemometer of FIG. 1.

DETAILED DESCRIPTION

Figure 1:
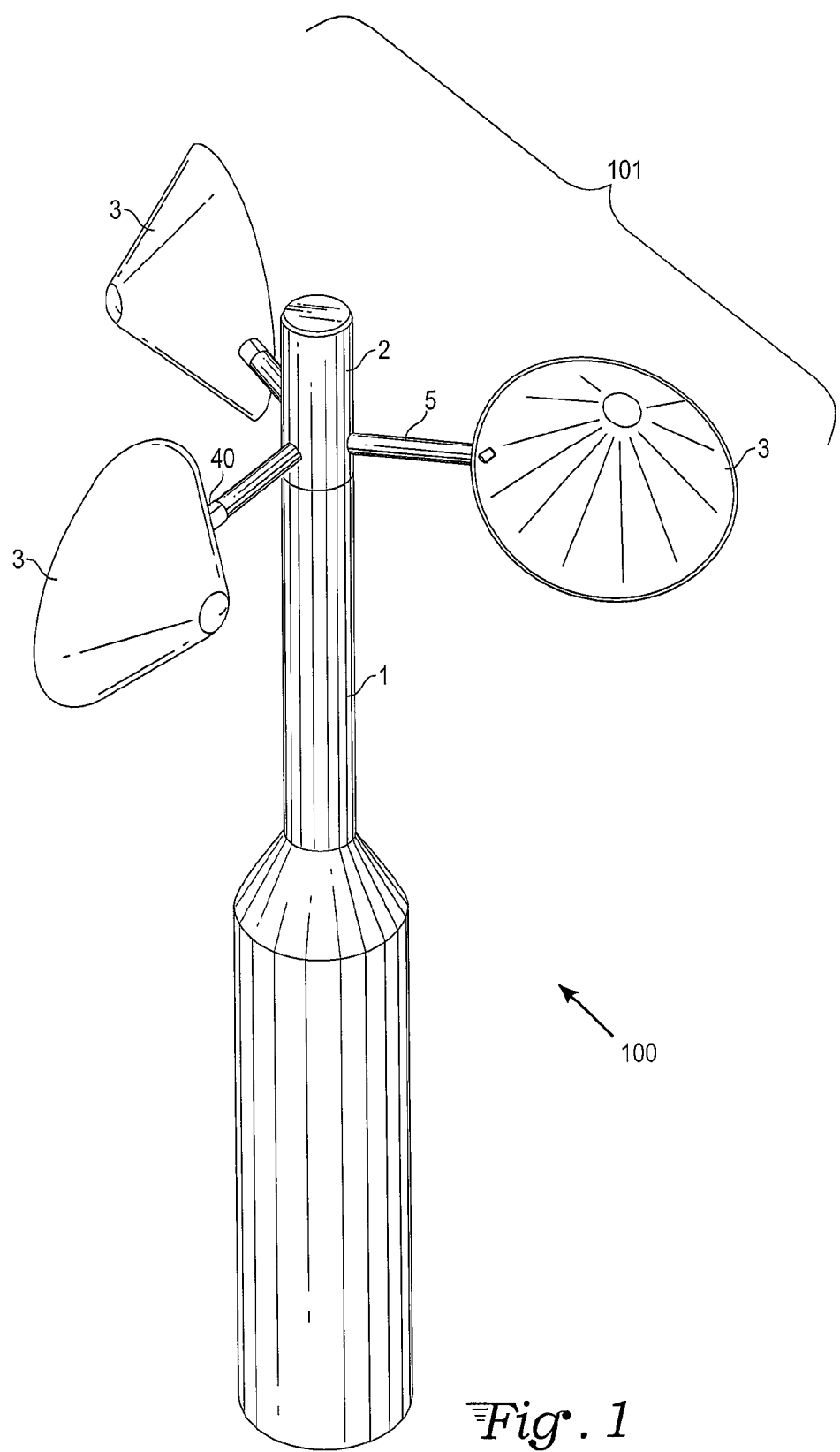
FIG. 1 is a perspective view of a rotational anemometer in accordance with the present invention.

With reference to FIG. 1, a rotational cup anemometer 100 having generally conical cups 3 with surface extensions is shown. In comparison with a standard or conventional conical cup anemometer, the cups with surface extensions provide the disclosed improved anemometer with improved accuracy of response to wind at various angles.

The standard or conventional conical cup anemometer provides a convenient reference for comparisons with the structure and performance of the improved anemometer. In the standard anemometer, axially symmetric conical cups revolve about an axis of rotation in a plane of rotation. The conical cups are disposed symmetrically about the plane of rotation, i.e. the central conical axis of each cup is aligned with the plane of rotation of the cups.

In the embodiment of the anemometer 100 shown in FIG. 1, the hub 2 is rotatably attached to a support member 1. Three cups 3 are connected to the hub 2. In various further embodiments, a triangular plate, a ribbed plate, a spar, a rib, or other reinforcement member may reinforce a connection of the cup to the arm. In an upright, non-tilted orientation of the anemometer, the maximum height of the hub 2 or other portion of the support member 1 is no higher than the highest point of the cups 3. In a further embodiment, the maximum height of the hub 2 or other portion of the support member 1 is no higher than about 5% of a maximum diameter of a cup 3 above the highest point of the cups 3. Still further embodiments may have various heights, use arms of various dimensions and shapes, or have various support members and rotatable members such as hubs or rotational shafts rotatably connected to stationary shafts or other support members.

Figure 2:
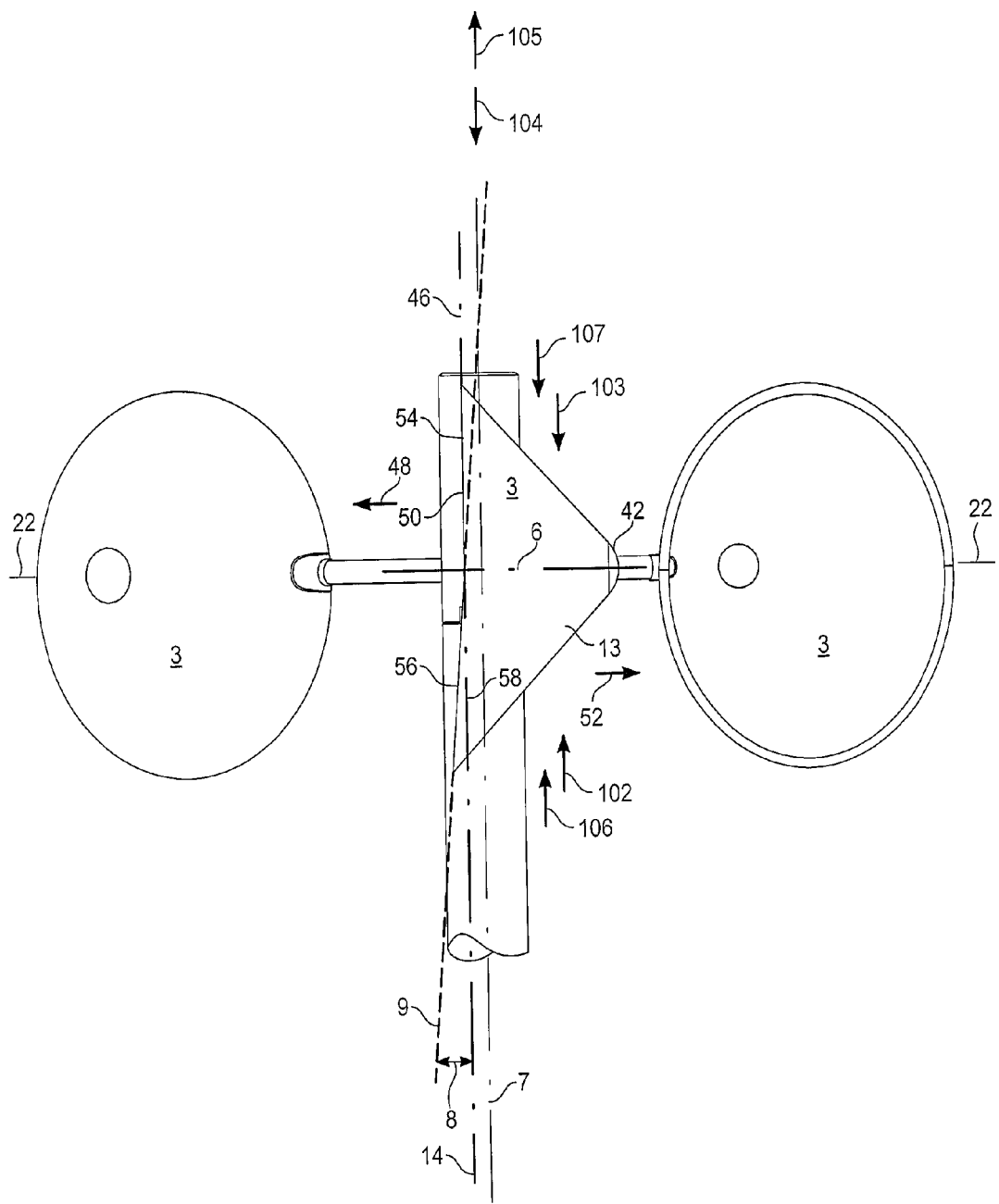
FIG. 2 is an elevated side view of the rotational anemometer of FIG. 1.

With reference to FIG. 2, a side view of the disclosed anemometer 100 shows a surface extension 14 of the lower half of a cup 3, with three such cups 3 disposed equally about a rotation axis 7 of the anemometer 100. Variations may have fewer or more cups. The cup 3 is generally cone-shaped, with a hemispherically rounded top 42 or vertex and a lower surface extension 14. Variations have other rounding shapes for the top or vertex of the cup, such as parabolic rounding, hyperbolic rounding, elliptical rounding and so on. A central axis 6 of the cup 3 is essentially aligned with the plane of rotation 22 of the cups 3 and is essentially perpendicular to the rotation axis 7, about which the cups 3 rotate in the plane of rotation 22. Alignment of the central axis 6 of the cup 3 with the plane of rotation 22 is within +/−½° (plus or minus one half of a degree). The term "essentially" is herein applied to mean generally within design, tuning, manufacturing and usage tolerances, and within such tolerances of ranges where specified.

Various geometrically defined planes may be visualized, to assist in the description and understanding of the structures in the anemometer. The above-discussed plane of rotation 22 is a first plane. A second plane 46 is perpendicular to the plane of rotation 22 and is offset in a windward direction 48 from the axis of rotation 7 relative to the cup 3. The cup 3 has a concave opening 50 or mouth facing windward, and moves in a leeward direction 52 when blown backwards i.e. propelled by a prevailing wind. The upper half 54 of the concave opening 50 of the cup 3, above the plane of rotation 22, abuts the second plane 46. A third plane 9 is intersecting with the second plane 46 at essentially the plane of rotation 22, and is tilted in the windward direction below the plane of rotation 22, and relative to a lower portion 58 of the second plane 46, by a tilt angle 8 of the extended surface 14. The lower half 56 of the concave opening 50 of the cup 3, below the plane of rotation 22, extends the extended surface 14 beyond the second plane 46 so that the extended surface 14 abuts the third plane 9. Thus, the second plane 46 and the third plane 9 perform conic sections on the generally cone-shaped cup 3, such that the upper half 54 of the opening 50 of the cup 3 forms a semicircle or semicircular rim or boundary and the lower half 56 of the opening 50 of the cup 3 forms half of an ellipse, or a semielliptical rim or boundary. The lower semielliptical rim has a more windward angle of tilt than the upper semicircular rim, which is essentially perpendicular to the plane of rotation and is thus not tilted to windward. In one embodiment, the tilt angle 8 of the extended surface 14 is less than or equal to about 10°. In a further embodiment, the tilt angle 8 of the extended surface 14 is less than or equal to about 15°. The cup 3 can be deconstructed as having a majority portion 13 that is conical and a lower surface extension 14 below the plane of rotation 22, with the majority conical portion 13 of the cup 3 being axially symmetric relative to the central axis 6 of the cup 3.

Figure 3:
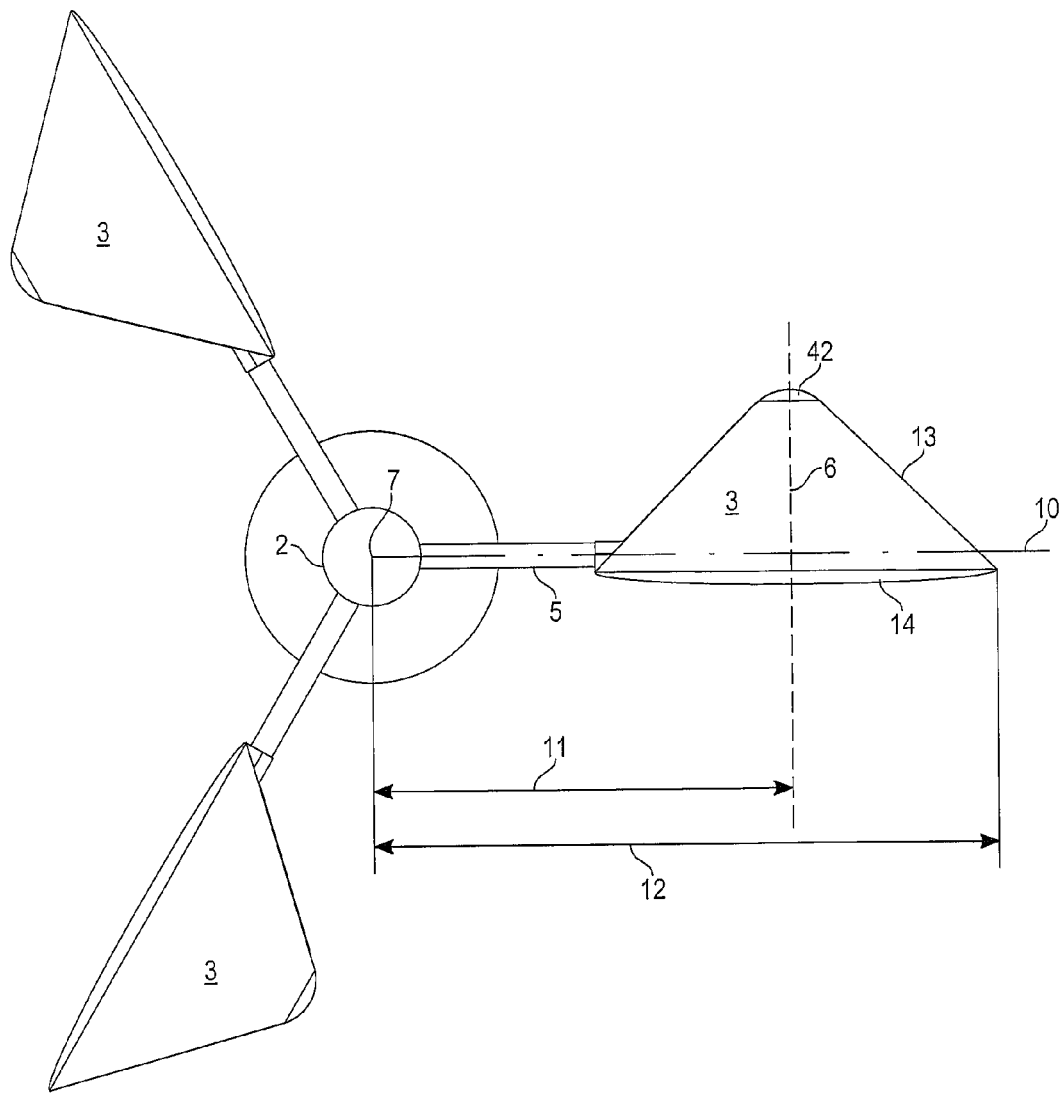
FIG. 3 is a top view of the rotational anemometer of FIG. 1.

With reference to FIG. 3, a top view of the anemometer shows the cups 3 equidistantly and equiangularly disposed about the axis of rotation 7. The respective arm 5 of each cup 3 extends radially outwardly from the hub 2 to the cup 3. The central axis 6 of the cup is perpendicular to a fourth plane 10 that intersects the axis of rotation 7 of the cups. Thus, the central axis 6 of the cup is tangential to a circle of rotation of the cups.

Figure 4:
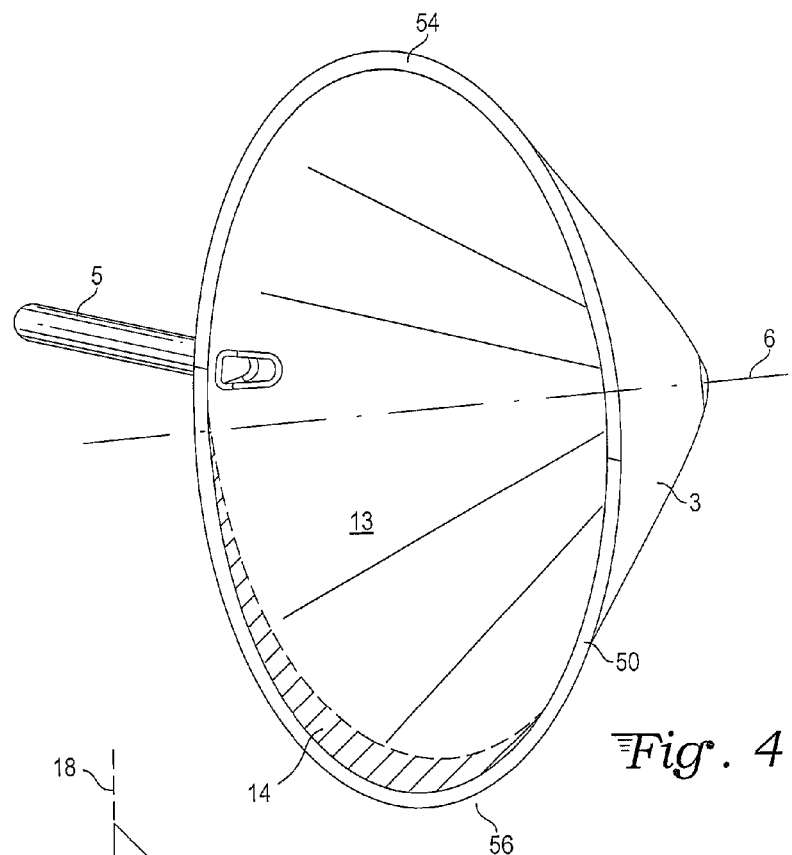
FIG. 4 is a perspective view of a cup of the rotational anemometer of FIG. 1.

With reference to FIG. 4, the extended surface forming the lower surface extension 14 (shown in shading lines) is clearly seen extending from a lower half of the cup 3. In one embodiment, the cup 3 is molded, machined or otherwise manufactured as a unitary body. Each of the cups is essentially identical to the other cups.

Figure 5:
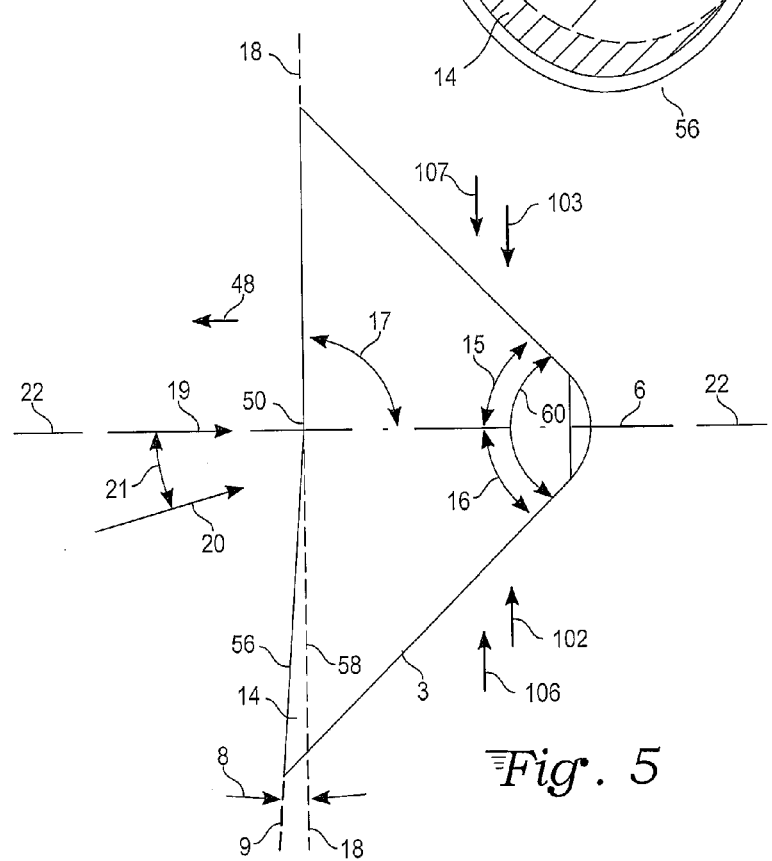
FIG. 5 is a side view of the cup of FIG. 4.

With reference to FIG. 5, a side view of the cup 3 shows various geometrically constructed angles. The majority conical portion 13 of the cup 3 is symmetric with regard to the central axis 6 of the cup, and has an upper cone angle 15 equal to a lower cone angle 16. The second plane 18, against which the upper half 54 of the opening 50 of the cup 3 abuts, is perpendicular to the central axis 6 of the cup 3. The third plane 9, against which the extended surface 14 and the lower half 56 of the opening 50 of the cup 3 abuts, is tilted relative to a lower portion 58 of the second plane 18 in a windward direction 48 by the tilt angle 8 of the extended surface 14. The tilt angle 8 may be adjusted depending upon the cone angle 60, which is the sum of the upper cone angle 15 and the lower cone angle 16, and may be adjusted depending upon the overall dimensions of the cup 3. In one embodiment, the cone angle is 90°, i.e. the majority conical portion of the cup is a 90° cone. The cone-shaped cup 3 moves in a leeward direction of travel 19 that is opposite to the windward direction 48 towards which the opening 50 of the cup 3 faces, in response to wind arriving in a wind direction 20 at a wind angle 21 relative to the plane of rotation 22 of the cups 3.

Figure 6:
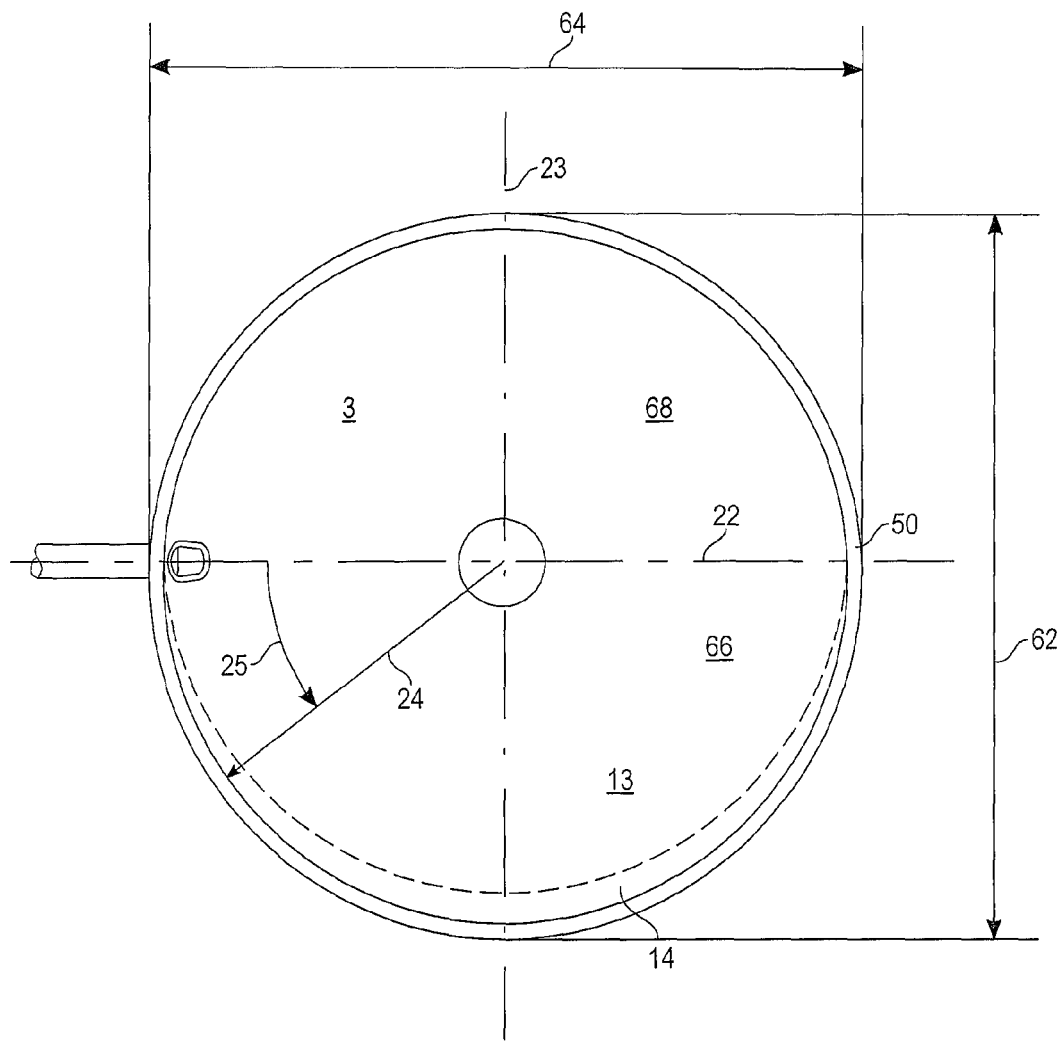
FIG. 6 is a front view of the cup of FIG. 4.

With reference to FIG. 6, a front view of the cup 3, with the cup 3 facing windward, shows the majority conical portion 13 of the cup 3 and the lower surface extension 14 of the cup 3. A maximum diameter 62 of the opening 50 of the cup 3 can be measured at the intersection of the opening 50 with a bisecting fifth plane 23, relative to which the cup 3 has mirror symmetry. The widthwise diameter 64 of the opening 50 of the cup 3 can be measured at the intersection of the opening 50 with the plane of rotation 22. The lower half 66 of the cup 3, below the plane of rotation 22, has a larger frontal area than does the upper half 68 of the cup 3, above the plane of rotation 22, as a result of the lower surface extension 14 of the cup extending from the majority conical portion 13 of the cup 3.

As can be seen in FIGS. 2-6, the cups 3 of the improved anemometer 100 are essentially identical. Each cup 3 is asymmetric with regard to a respective central axis 6 of the cup 3. Each cup 3 has the central axis 6 parallel to the plane of rotation 22 of the cups 3. Each cup 3 is asymmetric with regard to the plane of rotation 22.

Figure 7A:
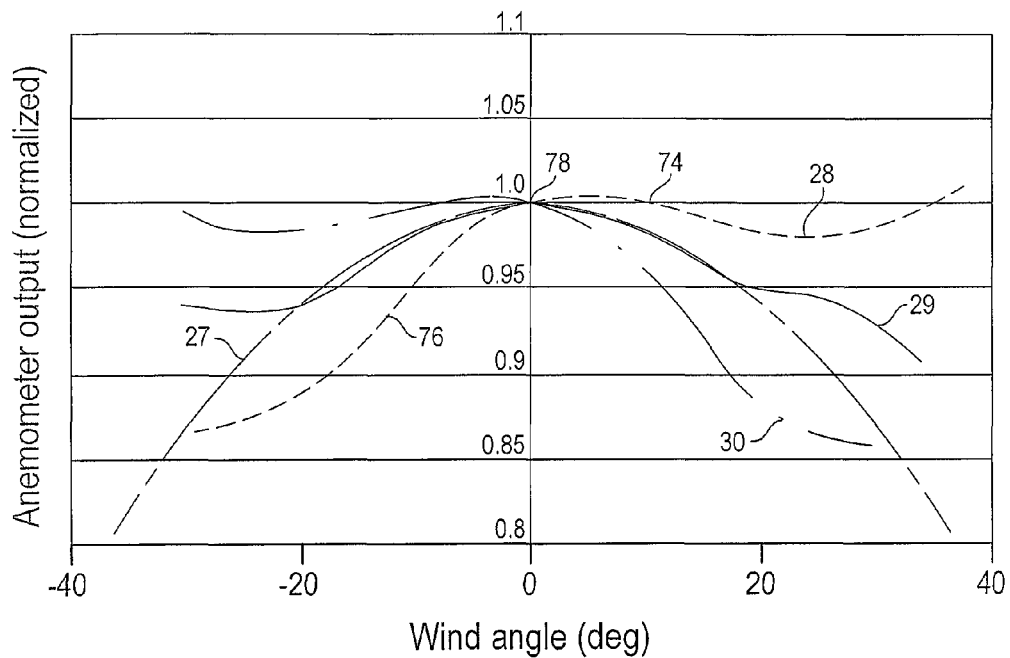
FIG. 7A is a graph of anemometer output (normalized) versus wind angle deviation comparing a conventional conical cup anemometer and the rotational anemometer of FIG. 1.

With reference to FIG. 7A, actual (i.e. not simulated) windtunnel tests performed on an embodiment of the disclosed anemometer 100 and on an embodiment of a conventional conical cup anemometer show improved accuracy resulting from the extended lower surface 14 of the improved anemometer 100. Normalized anemometer output (vertical axis) is plotted as a function of wind angle in degrees (horizontal axis), with test data in various dashed lines compared to the idealized cosine curve 27 response. Anemometer output is equal to or is proportional to the rotation rate of the cups, and normalizing the data adjusts this rotation rate to equal a normalized output of 1.0 at a wind angle of zero degrees, for a specified wind speed. The normalizing factor is then applied to the remainder of the data. Data and tests reported and depicted herein may be viewed as nominally accurate but should not be misconstrued as infinitesimally so.

Figures 7B, 7C:
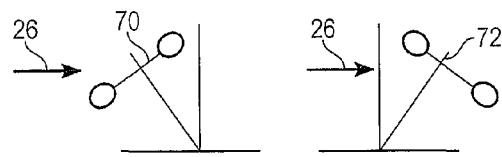
FIG. 7B is a side view of a conventional anemometer at a negative wind angle.
FIG. 7C is a side view of a conventional anemometer at a positive wind angle.

FIG. 7B depicts a negative wind angle, with an incident wind 26 angled downward with respect to the anemometer 70. FIG. 7C depicts a positive wind angle, with an incident wind 26 angled upward with respect to the anemometer 72. In real-world conditions, the anemometer 70 or 72 is generally mounted upright in a vertical, non-tilted orientation, with the plane of rotation of the cups horizontally oriented, and wind may arrive at various upward or downward angles. In a windtunnel, for testing purposes the anemometer 70, 72 is tilted to various angles and the wind 26 flows horizontally.

In FIG. 7A, the normalized anemometer output 28 of a conventional conical cup anemometer is seen as deviating below the ideal cosine curve 27 for negative wind angles and deviating above the ideal cosine curve 27 for positive wind angles. An idealized anemometer with a frictionless bearing and an infinitesimally narrow support member, or a finite thickness support member extending symmetrically and infinitely on both sides of the plane of rotation of the cups would have a normalized anemometer output that is symmetric with regard to positive and negative wind angles. A finite anemometer, with a support member that is truncated at or slightly above the plane of rotation of the cups, exhibits asymmetric response with respect to wind angle as a result of differential wind shadowing of the downwind cups passing behind the support member. Downwind cups experience a force opposing the direction of rotation of the cups as a result of the side profile of the cup "seen" by the wind, and such opposing force is reduced in wind shadowing. Thus, the standard anemometer speeds up relative to the ideal cosine curve for positive wind angles, as shown in the right-side half 74 of the curve for the normalized anemometer output 28 for a conventional anemometer as shown in FIG. 7A and the orientation of the anemometer depicted in FIG. 7C. Conversely, where a non-truncated support member would provide shadowing for the downwind cups in a negative wind angle orientation of the anemometer, the lack of such shadowing in the standard truncated support member allows the anemometer to slow down relative to the ideal cosine curve, as shown in the left-side half 76 of the curve for the normalized anemometer output 28 for a conventional anemometer as shown in FIG. 7A and the orientation of the anemometer depicted in FIG. 7B.

The normalized anemometer output 29 of the tested embodiment having conical cups with respective lower surface extensions shows a normalized anemometer output and thus a rotation rate as a function of wind angle closer to the ideal cosine curve 27 as compared to the standard or conventional conical cup anemometer having the normalized anemometer output 28. Deviation from the ideal cosine curve 27 occurs for the tested embodiment with the lower surface extensions at about +/−15° or about +/−20° of wind angle.

An embodiment of an anemometer having conical cups with too large lower surface extensions was windtunnel tested. The normalized anemometer output 30 of the embodiment with too large surface extensions appears as if rotated relative to the 0° (zero degree) wind angle point 78, and deviates immediately from the ideal cosine curve 27.

With reference to FIG. 8, an embodiment of the disclosed improved anemometer having specified dimensions was windtunnel tested, and the normalized anemometer output is plotted as a function of wind tilt angle for three different wind speeds. The embodiment measures 107.5 millimeters in an outer edge sweep radius length 12 from a center of the rotational axis 7 to the outermost extent of the cup 3 and 72.37 millimeters in a cone center sweep radius length 11 from the rotational axis 7 to the central axis 6 of the cup 3, as depicted in FIG. 3. The diameter of the opening 50 of the cup 3 at the intersection of the cup 3 with the plane of rotation 22 of the cups 3 is thus about 70 millimeters. For comparison, the ideal cosine curve 31, positive 1% deviation curve 32, negative 1% deviation curve 33, positive 3% deviation curve 34 and negative 3% deviation curve 35 are presented in the graph. The anemometer output curve 80 for wind speed 5 meters per second, the anemometer output curve 82 for 8 meters per second, and the anemometer output curve 84 for 12 meters per second are all within +/−1% departure from the ideal cosine response curve 31 in the wind angle range from −17° to +15° and within +/−3% departure from the ideal cosine response curve 31 in the wind angle range from −22° to +18°.

A two-part theory of operation for the disclosed improved anemometer at various wind angles is herein presented, followed by a discussion of tuning the cups of the anemometer.

The first part of the theory of operation for the disclosed improved anemometer is based on analysis of bearing friction and upwards and downwards forces acting on the cups and the bearing that supports rotation of the cups about the rotation axis.

In the absence of wind, the weight of the rotational assembly 101, including cups 3, arms 5, hub 2 and perhaps components of the bearing (not shown, internal), exerts a net downward force 104 on the bearing as shown in FIG. 2 and causes friction. In the presence of a positive wind angle, i.e. wind blowing at an upward angle, as in the right half of the graphs in FIGS. 7 and 8, there is an upward force 102 acting on each cup 3 in the rotational assembly 101, as shown in FIGS. 2 and 5. The sum of these upward forces 102 decreases the overall (net) downward force 104 on the bearing and reduces the friction of the bearing, resulting in an increase in rotation speed of the rotational assembly 101 relative to the ideal cosine curve 27 response. In the presence of a negative wind angle, i.e. wind blowing at a downward angle, as in the left half of the graphs in FIGS. 7 and 8, there is a downward force 103 acting on each cup 3 in the rotational assembly 101, which increases the overall (net) downward force 104 on the bearing and increases the friction of the bearing, resulting in a decrease in rotation speed relative to the ideal cosine curve 27. The above-described "weight effect" of wind at a wind angle acting on the bearing tends to raise the right-side half 74 of the curve for the normalized anemometer output 28 for a conventional anemometer as shown in FIG. 7A and tends to lower the left-side half 76 of the curve for the normalized anemometer output 28 for a conventional anemometer. An idealized, frictionless bearing does not show the "weight effect", as the downward force 104 doesn't increase the friction of the bearing and thus does not affect the rotational response of the rotational assembly 101 to wind at various wind angles.

Adding the lower surface extension 14 to each of the cups 3 causes each cup to contribute lift, i.e. an upward force 106 shown in FIGS. 2 and 5 as the cups rotate about the rotation axis. This lift is a result of the lower surface extension 14 being presented at an angle such that the lower surface extension 14 becomes or provides a lifting surface as the cups 3 rotate. Since there is no upper surface extension relative to the majority conical portion 13 of the cup 3, the asymmetric design results in a net lift as the cups rotate. This lift decreases the weight acting on the bearing, i.e. decreases the downward force 104 and thereby reduces friction in the bearing arising from the weight effect. Rotating the rotational assembly 101 in an upright orientation in a wind that is parallel to the plane of rotation produces an upward force from the lower half of each cup and a downward force from the upper half of each cup, the upward force being greater than the downward force as a result of the lower surface extension 14 being or providing a lifting surface. The lower surface extension 14 contributes to the upward force. The upward force 106, which is the net difference between the upward force and the downward force, offsets the weight of the rotational assembly 101.

The reduction in friction acting on the bearing results in the rotational assembly 101 rotating more quickly at a zero degree wind angle and having a lesser amount of weight-induced friction available for reduction in winds of a positive or upward wind angle. The upward force 106 opposes the downward force 103 acting on the cups 3 in a negative wind angle, reducing the friction on the bearing and speeding up the rotation rate as compared to the standard anemometer. Thus, the improved rotational anemometer 100 achieves a closer conformance to the ideal cosine curve for both negative and positive wind angles as compared to the standard anemometer. At-large positive wind angles, or for higher speed winds at a specified positive wind angle, the sum of the upward force 102 arising from a positive wind angle on the cups 3 and the upward force 106 arising from the lower surface extension 14 being a lifting surface as the cups 3 rotate may add to an overall net upward force 105 on the rotational assembly 101, and further increases may increase bearing friction and resistance to rotation.

The second part of the theory of operation for the disclosed improved anemometer is based on analysis of the cups traveling at an angle relative to the wind flow. At a positive wind angle, a windward facing propelled cup having the lower surface extension is traveling "downhill" i.e. at a downward angle relative to the wind flow. This situation is most readily visualized with the aid of FIGS. 2 and 7C. As a result of the relative angle between the wind flow and the relatively downward traveling windward facing cup, the lower surface extension presents very little added frontal area relative to the wind flow, and the force is not much increased on the cup as compared to a standard conical cup without a lower surface extension.

At the same positive wind angle, a returning leeward facing cup having the lower surface extension is traveling "uphill" i.e. at an upward angle relative to the wind flow. Such a cup is traveling into the wind, and providing a resistance to the wind. As a result of the relative angle between the wind flow and the relatively upward traveling leeward facing cup, the lower surface extension presents a larger added frontal area relative to the wind flow, and the resistance force is increased on the cup as compared to a standard conical cup without a lower surface extension.

Thus, the improved anemometer having cups with lower surface extensions rotates more slowly for the positive wind angle than does the standard anemometer having cups without such lower surface extensions, at a specified wind speed. Recall that for positive wind angles, the standard anemometer rotates more rapidly than the idealized cosine curve would predict. By rotating more slowly than does the standard anemometer for positive wind angles, the improved anemometer having cups with lower surface extensions more closely approaches the idealized cosine curve than does the standard anemometer.

A related analysis shows the converse is true for negative wind angles. At a negative wind angle, a windward facing propelled cup having the lower surface extension is traveling "uphill" i.e. at an upward angle relative to the wind flow. This situation is most readily visualized with the aid of FIGS. 2 and 7B. As a result of the relative angle between the wind flow and the relatively upward traveling windward facing cup, the lower surface extension presents additional frontal area relative to the wind flow, and the force is increased on the cup as compared to a standard conical cup without a lower surface extension.

At the same negative wind angle, a returning leeward facing cup having the lower surface extension is traveling "downhill", i.e. at a downward angle relative to the wind flow. Such a cup is traveling into the wind, and providing a resistance to the wind. As a result of the relative angle between the wind flow and the relatively downward traveling leeward facing cup, the lower surface extension presents very little added frontal area relative to the wind flow, and the resistance force is not much increased on the cup as compared to a standard conical cup without a lower surface extension.

Thus, the improved anemometer having cups with lower surface extensions rotates more rapidly for the negative wind angle than does the standard anemometer having cups without such lower surface extensions, at a specified wind speed. Recall that for negative wind angles, the standard anemometer rotates less rapidly than the idealized cosine curve would predict. By rotating more rapidly than does the standard anemometer for negative wind angles, the improved anemometer having cups with lower surface extensions more closely approaches the idealized cosine curve than does the standard anemometer.

The above discussion of theory applies first-order effects. Second-order and third order effects may also apply, and computational flow dynamics models may yield additional insights as to the theory and operation of the improved anemometer.

Tuning of the improved anemometer 100 is guided by applying knowledge of the theory of operation and of the differences between a real world anemometer and an idealized anemometer. Variations in hub weight, rotational assembly weight, arm length, hub height, support width or diameter, support height, cone angle, cone shape, cone dimensions, bearing friction and friction variation with regard to weight on the bearing, and other factors affect whether and which of the "weight effect", the lifting surface, wind shadowing, "downhill" and "uphill" frontal areas and other factors as discussed predominate in a particular implementation. For a specified set of dimensions, materials and configuration, the lower surface extension 14 of each of the cups 3 is tuned to achieve a specified closeness of fit in output response to the idealized cosine curve, over a range of wind speeds and wind angles.

As the above experimental results and theory demonstrate, the improved anemometer having asymmetric cups such as with lower surface extensions as described provides a more accurate measurement of wind speed at various wind angles than does the standard anemometer. Such an improved anemometer is a useful tool for evaluating sites for wind farms in the wind energy industry, and for weather stations, sailing, kite flying and other pursuits where an accurate measurement of wind speed is desired.

What is claimed is:

1. A rotational cup anemometer comprising a rotational assembly having a plurality of essentially identical cups arranged in a plane of rotation, with each of the plurality of cups having a majority conical portion with a respective central axis parallel to the plane of rotation and abutting a respective second plane essentially perpendicular to the plane of rotation and further having a lower surface extension portion extending below the plane of rotation from the majority conical portion beyond the respective second plane and abutting a third plane that is tilted in a windward direction with respect to the second plane by a tilt angle, wherein the tilt angle is selected to closely match a rotation rate of the rotational assembly as a function of a wind angle to an ideal cosine curve for a range of wind angle of up to about plus or minus fifteen degrees.

2. The rotational cup anemometer of claim 1, wherein the selected tilt angle of the third plane is less than or equal to about fifteen degrees with respect to the second plane.

3. The rotational cup anemometer of claim 1, wherein for each of the cups the respective second plane is displaced in a windward direction relative to an axis of rotation of the rotational assembly.

4. A rotational cup anemometer comprising a rotational assembly having a plurality of essentially identical cups arranged in a plane of rotation, with each of the plurality of cups having a generally conical shape with a respective central axis that is parallel to the plane of rotation and with an opening terminating above the plane of rotation at a second plane essentially perpendicular to the plane of rotation and terminating below the plane of rotation at a third plane intersecting the second plane at the plane of rotation and tilted in a windward direction relative to the second plane by a tilt angle so as to form a lower surface extension on each respective cup that forms a lifting surface as the rotational assembly is rotated by wind, wherein the tilt angle is selected to produce a net lifting force on the cups that offsets a weight of the rotational assembly when the rotational assembly is rotated by a wind that is parallel to the plane of rotation.

5. The rotational cup anemometer of claim 4, wherein the third plane is tilted in the windward direction by less than or equal to about fifteen degrees with respect to the second plane.

6. The rotational cup anemometer of claim 4, wherein the opening of each of the cups is displaced in the windward direction from a respective fourth plane intersecting a rotational axis of the rotational assembly.

7. A rotational cup anemometer comprising a rotational assembly having a plurality of essentially identical cups arranged in a plane of rotation, with each of the plurality of cups having a generally conical shape with a respective central axis parallel to the plane of rotation and with a respective central axis that is parallel to the plane of rotation and with a mouth with an upper semicircular rim essentially perpendicular to the plane of rotation and a lower semi-elliptical rim at a more windward angle of tilt than the upper semicircular rim so as to form a lower surface extension on each respective cup that contributes an upward force when the rotational assembly is rotated by wind, the windward angle of tilt being selected to produce a greater upward force than downward force when the rotational assembly is rotated by wind.

8. The rotational cup anemometer of claim 7 wherein a maximum height of a hub of the rotational assembly is less than or equal to about five percent of a maximum diameter of a one of the cups above a highest point of the plurality of cups in an upright non-tilted orientation of the anemometer.

9. The rotational cup anemometer of claim 7, wherein the cone axis of each of the cups is essentially within one half of a degree of the plane of rotation.

10. The rotational cup anemometer of claim 7, wherein the more windward angle of tilt is essentially less than or equal to ten degrees.

11. The rotational cup anemometer of claim 7, wherein the mouth of each of the cups is offset in a windward direction from a plane intersecting a rotational axis of the rotational assembly.

* * * * *